United States Patent Office 3,203,980
Patented Aug. 31, 1965

3,203,980
BROMO- AND CHLOROALKYL 4-ACETAMIDO-
PHENYL CARBONATES
Joseph V. Swintosky, Perkiomenville, Pa., assignor to
Smith Kline & French Laboratories, Philadelphia, Pa.,
a corporation of Pennsylvania
No Drawing. Filed Oct. 15, 1962, Ser. No. 230,727
5 Claims. (Cl. 260—463)

This invention relates to new organic compounds having valuable pharmacodynamic properties and to processes for their preparation. In particular it pertains to analgetic and hypnotic compounds possessing other highly desirable pharmacological, physical and chemical properties. The structure of these compounds may be represented as follows:

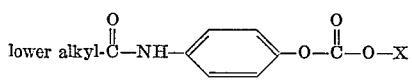

wherein X is a chlorinated or brominated lower alkyl group. The term "lower alkyl" is here and elsewhere employed to designate a straight or branched group containing up to and including 4 carbon atoms. The chlorinated and brominated lower alkyl group preferably contain less than 4 halogen atoms.

These compounds, in addition to their pharmacodynamic properties described above, are substantially tasteless and extremely stable. Not only are these compounds admirably suited for incorporation in sustained release pharmaceutical compositions, but in addition many possess inherent sustained release properties themselves, thus affording an analgetic-hypnotic agent with an increased duration of activity.

These compounds are preferably administered orally and in combination with a pharmaceutical carrier. Suitable carriers include solid materials such as talc, cornstarch, lactose, ethylcellulose, magnesium stearate, agar, pectin and the like, as well as liquid carriers including syrups, elixirs, suspending agents and the like.

The compounds of this invention are prepared by treating an anilide of the structure:

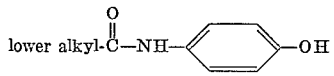

preferably as an alkali metal salt such as sodium or potassium salt, with a chloroformate of the particular chlorinated or brominated lower alkanol. The reaction may be executed in any of the usual inert water miscible solvents and quite advantageously in water itself. The desired product separates spontaneously and may be collected by filtration. The requisite chloroformate compound may be prepared by treating the appropriate chlorinated or brominated lower alkanol with phosgene according to standard methods known to the art as for example Slimowicz et al., JACS, 71, 1044 (1949).

Of the above compounds, 2,2,2-trichloroethyl 4-acetamidophenylcarbonate and the corresponding 2,2,2-tribromo compound are preferred. Employing the former of these for administration to adult humans, a suitable dosage comprises from about one gram to about eight grams per day, preferably from about two grams to about four grams per day.

The following examples will further serve to typify the nature of this invention but should not be construed as a limitation thereof.

EXAMPLE 1

A. *Preparation of 2,2,2-trichloroethyl chloroformate*

2,2,2-trichloroethanol (149.5 g., 1.0 mole) is added dropwise with stirring to 85 g. of liquid phosgene in a Dry Ice-trichloroethylene bath, maintaining a temperature of 0° or lower. The mixture is allowed to slowly reach room temperature upon completion of the addition while a calcium chloride protected outlet is employed to permit escape or excess phosgene. The mixture is then aerated and the 2,2,2-trichloroethyl chloroformate purified by distillation at reduced pressure.

B. *Preparation of 2,2,2-trichloroethyl 4-acetamidophenylcarbonate*

A solution of 30.2 g. (0.2 mole) of 4-hydroxy-acetanilide and 8.0 g. (0.2 mole) of sodium hydroxide in 100 ml. of water is added in a dropwise fashion to a chilled solution of 42.4 g. (0.2 mole) of 2,2,2-trichloroethyl chloroformate in 60 ml. of benzene over a period of 30 minutes. The mixture is then stirred for one hour and the product thereupon collected, dissolved in hot alcohol, clarified with carbon and filtered. Upon addition of hot water to the filtrate and cooling of the solution, the product is collected and dried. The product demonstrates a melting point of 155–157° C.

EXAMPLE 2

Equivalent amounts of the following halogenated lower alkanols are employed in the procedure of Example 1A and the resultant chloroformate thereafter utilized in treating the following anilides according to the method of Example 1B.

A. *Haloalkanol*

(a) 2,2,2-tribromoethanol
(b) 2-methyl-2-chloro-1-propanol
(c) 3-bromo-2-butanol
(d) trichloromethyldimethylcarbinol B. *Anilide*

(a) 4-hydroxyacetanilide
(b) N-(4-hydroxyphenyl)-propionamide
(c) N-(4-hydroxyphenyl)-butyramide
(d) 4-hydroxyacetanilide C. *Product*

(a) 2,2,2-tribromoethyl 4-acetamidophenylcarbonate
(b) 2 - methyl-2-chloropropyl 4-butyramidophenylcarbonate
(c) 3-bromo-2-butyl 4-acetamidophenylcarbonate
(d) 2 - trichloromethyl - 2 - propyl 4-acetamidophenylcarbonate Similarly the haloalkanols may be combined with the anilides in other orders than those recited above.

What is claimed is:
1. A compound of the formula:

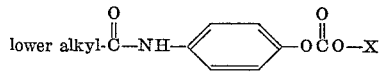

wherein X is selected from the group consisting of chlorinated lower alkyl and brominated lower alkyl.

2. A compound of the formula:

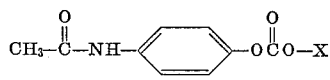

wherein X is chlorinated lower alkyl.

3. A compound of the formula:
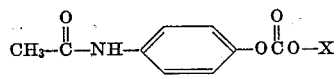
wherein X is brominated lower alkyl.
4. 2,2,2-trichloroethyl 4-acetamidophenylcarbonate.
5. 2,2,2-tribromoethyl 4-acetamidophenylcarbonate.
References Cited by the Examiner
UNITED STATES PATENTS
2,548,141   4/51   Brailey _____ 260—463
3,032,555   5/62   Oxley et al. _____ 260—463
CHARLES B. PARKER, *Primary Examiner.*